Jan. 31, 1956 L. T. FROST ET AL 2,733,069

POCKET TAPE RECORDER

Filed Aug. 27, 1951 3 Sheets-Sheet 1

INVENTORS
LOYD T. FROST
WILLIAM A. HAMER

BY

Semmes, Keegin, Robinson & Semmes,
ATTORNEYS

Jan. 31, 1956 L. T. FROST ET AL 2,733,069

POCKET TAPE RECORDER

Filed Aug. 27, 1951 3 Sheets-Sheet 2

INVENTORS
LOYD T. FROST
WILLIAM A. HAMER

BY Semmes, Keegin, Robinson & Semmes
ATTORNEYS

Jan. 31, 1956 L. T. FROST ET AL 2,733,069

POCKET TAPE RECORDER

Filed Aug. 27, 1951 3 Sheets-Sheet 3

INVENTORS
LOYD T. FROST
WILLIAM A. HAMER

BY
Semmes, Keegin, Robinson & Semmes
ATTORNEYS

United States Patent Office 2,733,069

Patented Jan. 31, 1956

2,733,069

POCKET TAPE RECORDER

Loyd T. Frost, Riveredge, and William A. Hamer, Lyndhurst, N. J.; said Hamer assignor to said Frost Application August 27, 1951, Serial No. 243,894

1 Claim. (Cl. 274—4)

This invention relates to magnetic tape recording apparatus in general. More particularly this invention relates to portable magnetic tape recording apparatus that may be carried by the user in his coat pocket.

An object of this invention is to provide an improved portable magnetic tape recorder.

Another object of this invention is to provide a magnetic tape recorder having an improved tape handling mechanism.

Still another object of this invention is to provide a magnetic tape recorder in which the tape is wound from one hub upon another by a capstan positioned to engage the reels of tape wound upon the hubs.

A further object of this invention is to provide a magnetic tape recorder in which the tape is wound from one hub upon another and in which the reels of tape formed on the hubs are confined between a pair of polished flat surfaces which act as guides in the unreeling of the tape from one of the hubs and in the reeling thereof on the other hub.

Still a further object of this invention is to provide a portable magnetic tape recorder with an amplifier in which the current consumption is automatically reduced to a minimum during periods or intervals when no recording is taking place in order to conserve the life of the batteries employed therewith.

Still another object of this invention is to provide a magnetic tape recorder in which reels of tape are formed on spaced hubs that are urged toward each other by a spring so as to cause the reels of tape to bear against a driven wheel.

Other and further objects of this invention will be apparent to those skilled in the art to which it relates from the following specification and claim.

In accordance with this invention there is provided a small, compact and highly portable magnetic tape or magnetic wire recorder which may be carried in the coat pockets of the user. This apparatus is provided with a highly efficient arrangement for moving the magnetic tape past the recording or reproducing head. For this purpose there is employed a driven wheel that engages the outer layers of the magnetic tape carried by a pair of slidably movable hubs. Thus the hub that is releasing the magnetic tape moves closer to the driving wheel while the hub receiving the magnetic tape moves further away from the driving wheel as the recording or reproducing process goes on. This arrangement is driven by a small and compact motor that is coupled thereto by a small substantially silent gear train.

The recording and reproducing head of this device is connected to a highly efficient and compact amplifier that is biased so as to draw no appreciable current from the B battery when no signal is being amplified. As a result the life of the B battery is greatly prolonged.

Other and further features of this invention are set forth in the following specification, claim and drawing.

Referring to the drawing briefly:

Figure 1:
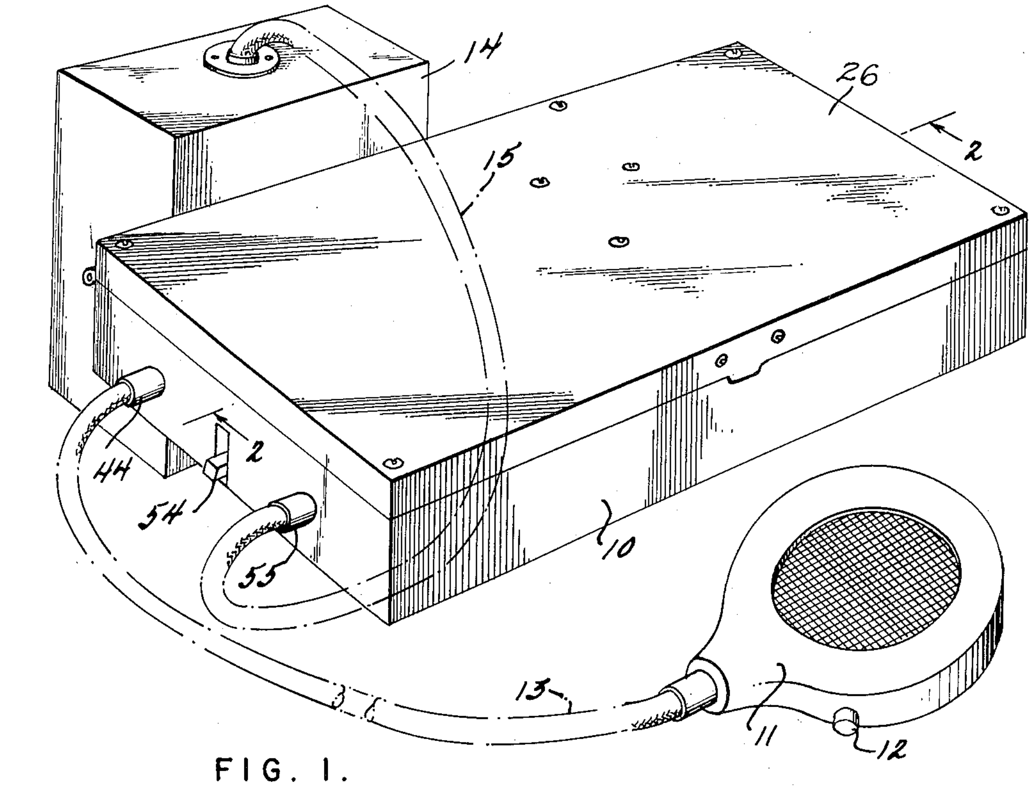
Fig. 1 is a perspective view of this apparatus enclosed in appropriate pocket size cabinets.
Figures 6, 7:
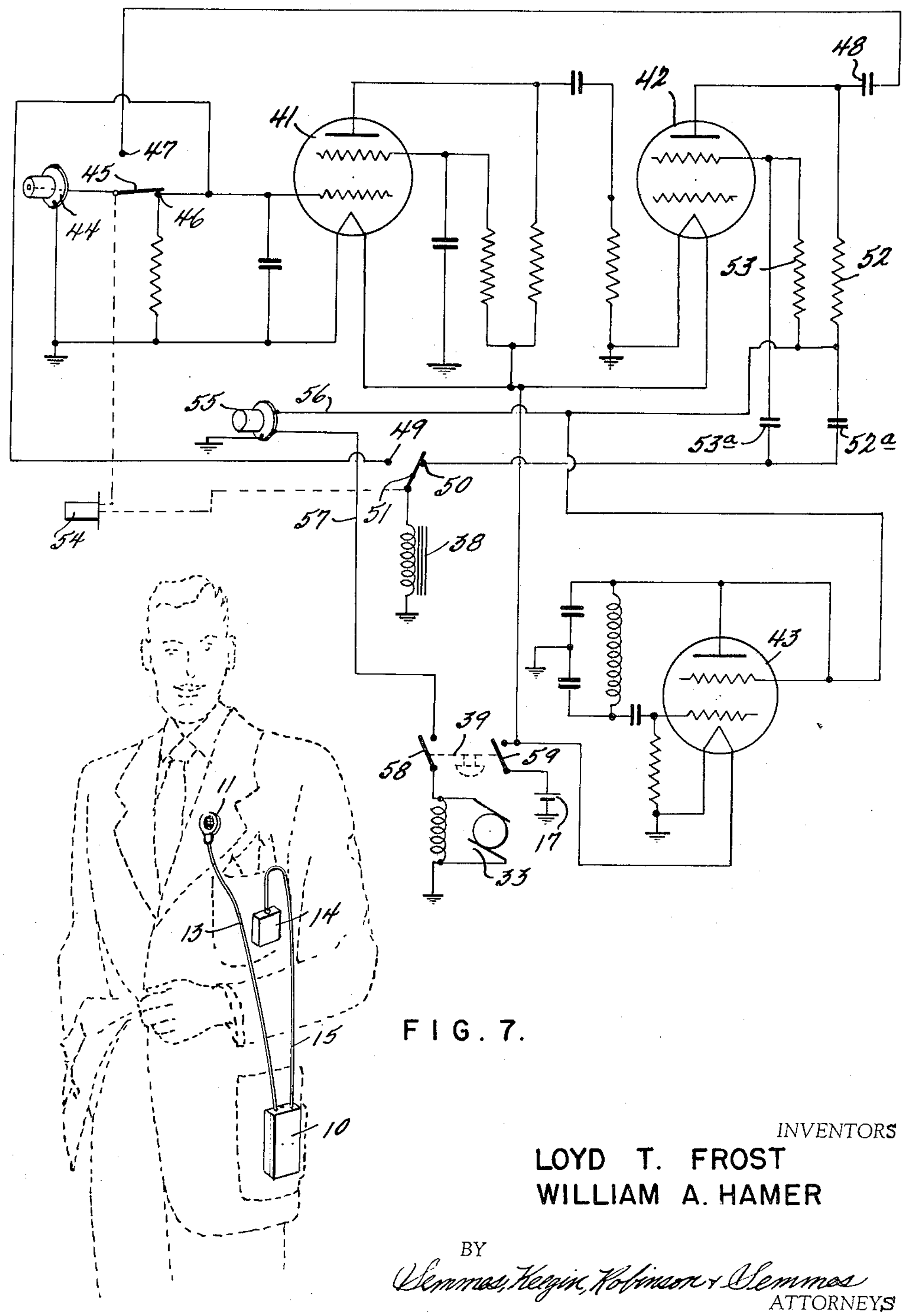
Fig. 6 is a circuit diagram of the vacuum tube circuit arrangement employed in accordance with this invention.
Fig. 7 is a view showing how this portable tape recording apparatus may be worn by the user.

Referring to the drawing in detail, there is illustrated in Fig. 1 a view of the cabinet 10 employed for housing the different parts of this magnetic tape recorder to form compact units that may be inserted into the user's coat pockets as shown in Fig. 7. A microphone 11 which may be provided with a switch actuated by a finger button 12 is connected by a cable 13 to the tape recorder housed in the cabinet 10. This device 11 may be of a type that may be used either as a microphone or as an ear phone or loud speaking type reproducer as will be described hereinafter. The battery that is employed for energizing the anode circuits of the vacuum tubes and the tape recorder motor is enclosed in the box 14 which is also of a small size such as may be inserted into the user's coat pocket. This battery is connected to the tape recorder apparatus by the cable 15. It is, of course, obvious that the batteries in the box 14 may be housed in the cabinet 10 if desired and the box 14 thus eliminated.

Figure 2:
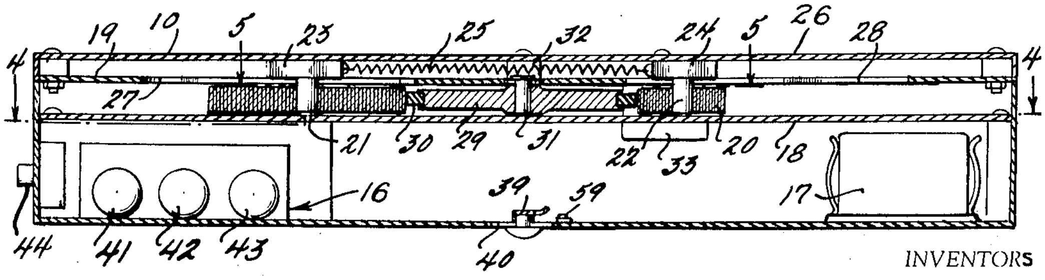
Fig. 2 is a sectional view taken along the line 2—2 of Fig. 1.

The cabinet 10 provides space in the lower portion thereof as shown in Fig. 2 for the vacuum tube amplifier 16 and the battery 17 employed for heating the filaments or cathodes of the vacuum tubes. This portion of the cabinet is divided from the upper portion by the partition 18, the upper surface of which is polished. Another partition 19, the lower surface of which is polished is spaced from the partition 18 by a distance that is slightly greater than the width of the magnetic tape 20 so that the polished surfaces of the parts 18 and 19 cooperate to form guides for the magnetic tape 20 as this tape is wound between the hubs 21 and 22 during the recording and reproducing processes. While we have shown the magnetic tape as wound directly on the hubs 21 and 22 it is, of course, obvious that this tape may be wound on reels and these reels slipped upon the hubs.

Figure 3:
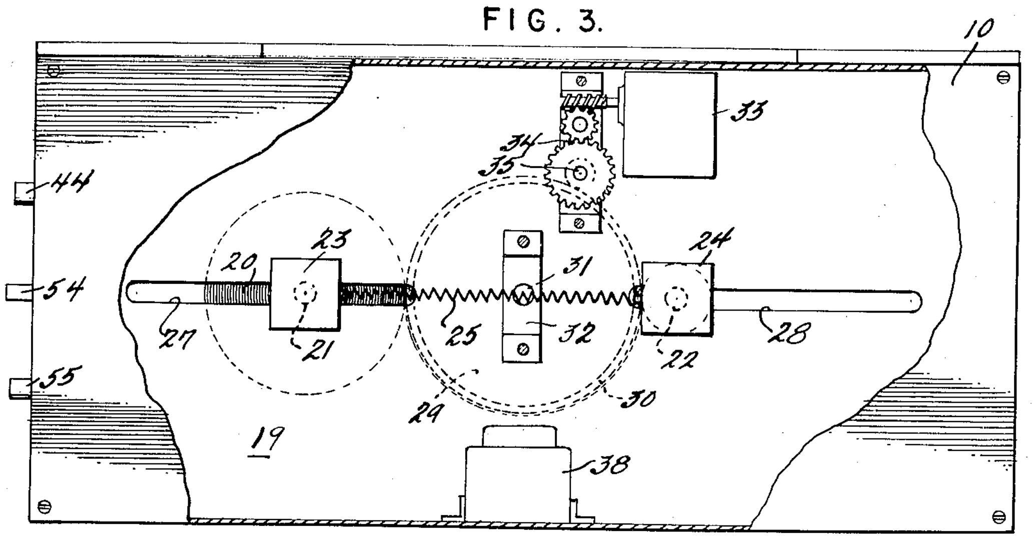
Fig. 3 is a view of the apparatus shown in Fig. 2 with a portion of the cover of the cabinet thereof broken away.
Figure 4:
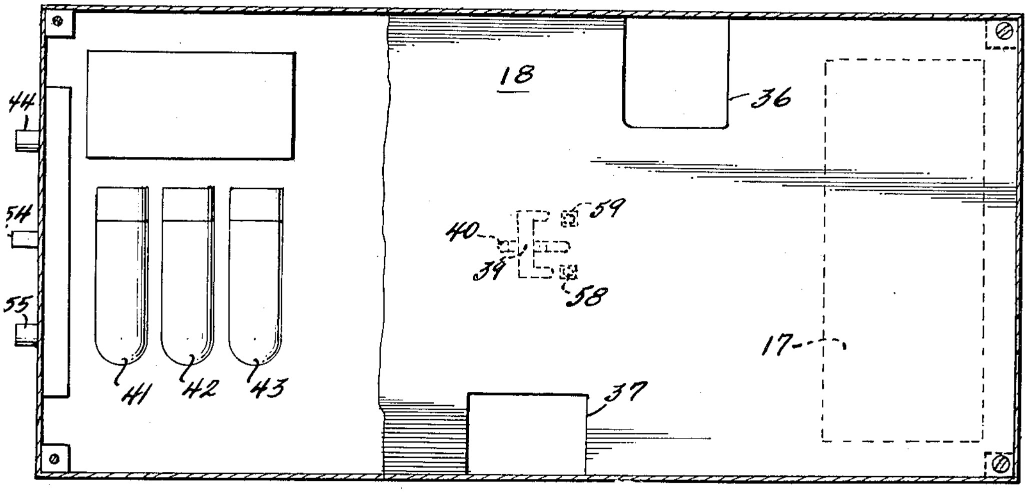
Fig. 4 is a sectional view taken along the line 4—4 of Fig. 2.
Figure 5:
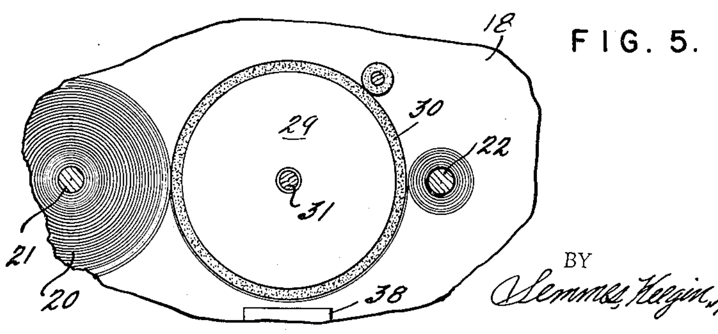
Fig. 5 is a fragmentary sectional view taken along the line 5—5 of Fig 2.

The hub 21 is supported at one end in the guide block 23 and the hub 22 is likewise supported at one end in the guide block 24. These blocks 23 and 24 are connected to the ends of a spring 25 as shown in Fig. 3. The blocks 23 and 24 are slightly thinner than the space provided between the partition 19 and the top 26 of the cabinet 10 so that these blocks may slide in this space when the hubs 21 and 22 are moved longitudinally in the slots 27 and 28 respectively.

A wheel 29 that is provided with a rubber tire 30 for engaging the outer layers of the magnetic tape 20 wound on the hubs 21 and 22, is supported on the bearing 31 that is in turn supported by the arch shaped member 32. In cases where the tape is supported by reels the wheel 29 is made thin enough to clear the inner surfaces of the side walls of the reel in order to reach into the reel to contact the outer layer of tape wound on the reel.

The arch shaped member 32 is attached to the inside surface of the cover 26 and straddles the spring 25. A small motor 33 adapted to run from power supplied by a 4½ volt battery in the box 14 is employed for driving the speed reducing gears 34 which may be made of plastic material, "Bakelite", hard rubber and the like for quiet operation. This speed reducing gear train in turn drives the spindle 35 that engages the circumference of the tire 30 of rubber or like material carried by the wheel 29.

The motor 33 may be constructed in various ways and instead of being made as a separate unit it may be encased within the central part of the wheel or capstan 29 so that the rim of this wheel is driven with respect to said central part without the use of interconnecting gears, pulleys or belts. Furthermore, the gear train 34 may be replaced by a suitable belt and pulley arrangement, if desired.

The motor 33 is positioned in the aperture 36 formed in the partition 18. A similar hole 37 is provided in this partition to receive the recording and reproducing head 38, and the gap in the magnetic circuit of this head is positioned close to the tire of the wheel 29 so that the tape being wound between the hubs 21 and 22 by the wheel 29 must pass adjacent to this air gap. As seen in Figure 3, that portion of the tape 20 extending between the hubs 21 and 22, embraces and is supported by the periphery of the tire 30 of wheel 29. Thus, as the wheel rotates with respect to the reproducing head 38, the tape is progressively presented to the gap in the adjacent reproducing head.

The recording and reproducing head 38 is preferably provided with a spring mount so that this head is mounted in such a way as to be readily moved away from the tape for loading. The spring mount functions to push the head back into proper relation against the tape.

A switch 39 is slidably supported in the slot 40 in the bottom of the cabinet 10 for the purpose of opening or closing the circuit between the motor 33 and the battery supplying the power thereto that is positioned in the box 14. This switch also is provided for the purpose of opening or closing the circuit between the battery 17 positioned in the bottom of the cabinet 10 and the filaments or cathodes of the vacuum tubes 41, 42 and 43 that are connected as shown in the wiring diagram illustrated in Fig. 6.

The switch 39 also may be constructed so as to arrange the circuit between the motor 33 and the battery supplying the current thereto so that this motor may be readily reversed for rewinding the tape after recording whereby the tape will be properly wound for reproduction.

The connecting receptacle 44 that is supported on the side of the cabinet 10 is provided with a ring of conducting material that is connected directly to the cabinet 10 which may be made of metallic material. Inside of this ring is a contact insulated therefrom and this contact is connected to the switch 45 which is provided with a pair of terminals 46 and 47. One of these terminals 46 is connected to the control grid of the amplifier tube 41 and the other terminal 47 is coupled by means of the capacitor 48 to the anode of the amplifier tube 42. The control grid of the amplifier tube 41 is also connected to the terminal 49 of the switch 51 which is connected to one side of the recording and reproducing head 38. The other terminal 50 of the switch 51 is coupled to the anode of the tube 42 through the capacitor 52$a$ and the plate resistor 52 and to the screen grid of the tube 42 through the capacitor 53$a$. The switches 45 and 51 are insulated from each other, however, they are mechanically coupled so as to be operable together by the button 54 that is positioned on the side of the cabinet 10 as shown in Fig. 1.

The cable 15 is provided for the purpose of connecting the batteries in the box 14 to the apparatus in the cabinet 10 and for this purpose this cable is plugged into the receptacle 55 that is provided to the side of the cabinet. This receptacle consists of a metallic ring connected to the metal cabinet 10 which forms the grounded side of the circuit. The cable 15 may consist of a sheath that is to be connected to this metallic ring and a pair of conductors within the sheath but insulated therefrom. The metal sheath of the cable 15 is, of course, connected to the negative terminal of the B battery and the negative terminal of the motor battery housed in the box 14. The positive terminals of these batteries are connected to the two conductors within the sheath of the cable 15 so that the positive terminal of the B battery is connected to the wire 56 which is connected to the screen grids and anodes of the amplifier tubes 41 and 42 and the oscillator tube 43. The other conductor in the cable 15 which is connected to the positive terminal of the motor battery is connected to the wire 57 that is in turn connected to the motor switch 58. The motor switch 58 and the filament switch 59 are insulated from each other but they are mechanically connected to be operable by the slidable button 39 which is positioned on the bottom of the cabinet 10.

The vacuum tubes 41 and 42 function to amplify the output of the microphone 11 during the recording of the signals picked up by the microphone. The switches 45 and 51 are positioned to contact the terminals 46 and 50 respectively during this recording process so that the microphone is connected to the control grid of the amplifier 41 and the output of the amplifier 42 is connected to the recording head 38. During this recording process the magnetic tape is moved past the air gap of the head 38 by the wheel 29 that is being rotated by the motor 33. Also during this recording process the oscillator tube 43 is supplying high frequency oscillations to the output circuit of the amplifier 42 and these high frequency oscillations are modulated by the signal to be recorded.

During the reproduction of the signals recorded on the magnetic tape the switch 45 is positioned to contact its terminal 47 and the switch 51 is positioned to contact its terminal 49 so that the head 38 is now connected as a reproducing device for picking up the magnetic impulses from the magnetic tape and supplying them to the control grid of the tube 41. The device 11 which functioned as a microphone during the recording is now connected as a sound reproducing device and is supplied with amplified signals from the anode circuit of the amplifier tube 42.

One of the important features of this invention resides in the high efficiency of the amplifier in that this amplifier is biased so that the anode circuits thereof do not draw any appreciable current when no signal is being applied to the input circuit thereof. As a result the life of the B battery is greatly prolonged.

In cases where it is desired to use wire in place of tape for receiving the magnetic recording pulses it is of course desirable to wind the wire on suitable reels which are placed on the hubs 21 and 22. The wire may be wound from one reel upon the other by the wheel 29 in the same manner as the tape.

While we have described the preferred embodiment of this invention in detail it will be apparent that modifications therein may be made without departing from the spirit and scope of this invention and therefore we do not desire to limit this invention to the exact details described and illustrated except insofar as those details may be defined by the claim.

What we claim is as follows:

A portable magnetic tape recorder comprising a container having an elongated, narrow compartment, a magnetic tape confined in said compartment, a pair of laterally spaced and laterally movable hubs extending into said compartment for receiving said tape, one side wall of said compartment having elongated, aligned slots cut therein, a second elongated compartment parallel to said first compartment, studs formed on said hubs and extending into said second compartment through said slots, guide blocks attached to said studs and slidably positioned in said second compartment, a wheel interposed between said hubs in direct alignment therewith, the periphery of said wheel engaging the outer peripheral layers of said tape wound on said hubs and embracing the intervening portion of said tape passing between said hubs, means for driving said wheel for winding said tape from one hub to the other, a spring attached to said guide blocks for moving the one of said hubs releasing said tape, in a direct line toward said wheel, the other of said hubs receiving said tape being moved in a direct line away from said wheel by pressure applied by said wheel to the tape being wound on said last named hub, and means in said container for receiving signals on said tape and reproducing signals therefrom, said means including a magnetic head positioned adjacent that side of the periphery of said wheel which embraces the intervening portion of said tape, whereby the periphery of the rotating wheel progressively presents the tape to said head.

References Cited in the file of this patent

UNITED STATES PATENTS

| | | |
|---|---|---|
| 1,563,382 | Legg | Dec. 1, 1925 |
| 1,691,414 | Thornton | Nov. 13, 1928 |
| 2,374,038 | Rees | Apr. 17, 1945 |
| 2,457,699 | Marsen | Dec. 28, 1948 |
| 2,609,457 | Thurm | Sept. 2, 1952 |

FOREIGN PATENTS

| | | |
|---|---|---|
| 20,073 | Great Britain | Feb. 22, 1906 |
| 702,345 | Germany | Feb. 5, 1941 |